(12) United States Patent
Stuart et al.

(10) Patent No.: US 10,974,979 B1
(45) Date of Patent: Apr. 13, 2021

(54) WATER CLEANING COMPOSITION AND RELATED METHODS

(71) Applicants: James Stuart, Jupiter, FL (US); David Stuart, Jupiter, FL (US)

(72) Inventors: James Stuart, Jupiter, FL (US); David Stuart, Jupiter, FL (US)

(*) Notice: Subject to any disclaimer, the term of this patent is extended or adjusted under 35 U.S.C. 154(b) by 0 days.

(21) Appl. No.: 14/581,226

(22) Filed: Dec. 23, 2014

Related U.S. Application Data

(60) Provisional application No. 61/921,247, filed on Dec. 27, 2013.

(51) Int. Cl.
C02F 1/72 (2006.01)
C02F 1/52 (2006.01)
C02F 1/66 (2006.01)
C02F 1/68 (2006.01)

(52) U.S. Cl.
CPC ............ C02F 1/722 (2013.01); C02F 1/5245 (2013.01); C02F 1/66 (2013.01); C02F 1/683 (2013.01); C02F 2303/22 (2013.01)

(58) Field of Classification Search
CPC ....................................................... C02F 1/722
See application file for complete search history.

(56) References Cited

U.S. PATENT DOCUMENTS

| | | | | |
|---|---|---|---|---|
| 6,267,979 B1* | 7/2001 | Raad | ...... | A01N 37/44 424/405 |
| 8,911,793 B1* | 12/2014 | Loucaides | ............. | C02F 1/4606 424/618 |
| 2006/0078584 A1* | 4/2006 | Lightcap | ................ | A01N 59/00 424/405 |
| 2007/0151932 A1* | 7/2007 | Bolduc | ................. | C02F 1/5245 210/724 |
| 2009/0081806 A1* | 3/2009 | Reeves, III | ............... | C02F 1/66 436/163 |
| 2014/0091046 A1* | 4/2014 | Ma | .......................... | C02F 1/722 210/759 |
| 2014/0299526 A1* | 10/2014 | Mastio | ................... | G01N 31/22 210/94 |

* cited by examiner

*Primary Examiner* — Peter Keyworth
(74) *Attorney, Agent, or Firm* — Allen Dyer Doppelt & Gilchrist, PA

(57) ABSTRACT

A composition for cleaning water using an electrolytic chlorine generator includes an oxidizer, a pH reducer, a flocculent, a chelator, and a borate compound. A method of cleaning water treated with an electrolytic chlorine generator includes adding, to a body of water treated with an electrolytic chlorine generator, the composition.

13 Claims, No Drawings

WATER CLEANING COMPOSITION AND RELATED METHODS

FIELD OF THE INVENTION

The invention relates to the field of water cleaning, and, more particularly, to water cleaning compositions used with an electrolytic chlorine generator.

BACKGROUND OF THE INVENTION

Electrolytic chlorine generators or "ECGs" treat water by producing chlorine from sodium chloride using an electrolytic process in which NaCl is converted into hypochlorous acid and sodium hydroxide. ECGs are very effective, but they suffer from several drawbacks. One of the drawbacks is that the generated sodium hydroxide raises the pH of the water. Another drawback is that chlorine generation results in the formation of a lot of calcium, carbonate, sulfate, and phosphate scale on the ECG electrodes and pool surfaces. These drawbacks, when combined, decrease the useful lifetime of the ECG's electrolytic cells and add undesirable impurities to the water.

SUMMARY OF THE INVENTION

In view of the foregoing, it is an object of the present invention to provide an improved composition for cleaning water using an electrolytic chlorine generator and related methods.

According to an embodiment of the present invention, a composition for cleaning water using an electrolytic chlorine generator includes an oxidizer, a pH reducer, a flocculent, a chelator, and a borate compound.

According to a further embodiment of the present invention, a composition for cleaning water using an electrolytic chlorine generator includes dipotassium peroxodisulfate, sodium hydrogen sulfate, aluminum sulfate, tetrasodium ethylenediamine tetraacetic acid (EDTA), and disodium tetraborate pentahydrate.

According to a method aspect, a method of cleaning water treated with an electrolytic chlorine generator includes adding, to a body of water treated with an electrolytic chlorine generator, the composition.

These and other objects, aspects and advantages of the present invention will be better understood in view of the drawing and following detailed description of preferred embodiments.

DETAILED DESCRIPTION OF PREFERRED EMBODIMENTS

Reference is made herein to particular features, including method steps. Where a particular feature is disclosed in the context of a particular aspect or embodiment, that feature can also be used, to the extent possible, in combination with and/or in the context of other aspects and embodiments.

In this section, embodiments will be described more fully. These embodiments may, however, take many different forms and should not be construed as limited to those set forth herein.

The water cleaning composition described here is advantageously adapted for use with pools or other water bodies that are treated using an ECG. The composition is formulated to address the drawbacks associated with using ECGs and elongate the life of the ECG's electrolytic cells. The composition includes an oxidizer, a pH reducer, a flocculent, a chelator, and a borate compound.

The oxidizer is preferably 30%-50% w/w of the composition. The oxidizer cleans the water by killing microbes and oxidizing organic contaminants. The preferred oxidizer is chlorine-free and generates peroxodisulfate ions in an aqueous solution. A suitable example is dipotassium peroxodisulfate ($K_2S_2O_8$), also known as potassium persulfate. Dipotassium peroxodisulfate is advantageous for use in ECG treated water because it also reduces the number of calcium ions that are available to form calcium scale.

The pH reducer is preferably 10%-25% w/w of the composition. The pH reducer counteracts the pH increase caused when the ECG generates sodium hydroxide. The preferred pH reducer generates bisulfate ions in an aqueous solution. A suitable example is sodium hydrogen sulfate ($NaHSO_4$), also known as sodium bisulfate.

The flocculent is preferably 10%-25% w/w of the composition. The flocculent assists with water clarification and scale removal by sticking small particles together in a larger conglomerate that can be filtered. The preferred flocculent is aluminum sulfate ($Al_2(SO_4)_3$). Preferably, the flocculent is iron-free.

The chelator is preferably 10%-25% w/w of the composition. The chelator sequesters positively charged ions such as calcium before they can bond with counter-ions such as carbonates, phosphates, and sulfates to form scale. Accordingly, the chelator prevents the type of scale formation often associated with ECGs. The preferred chelator contains ethylenediamine tetraacetic acid (EDTA). A suitable example is tetrasodium EDTA.

The borate compound is preferably 10%-25% w/w of the composition. The borate compound acts as a water clarifier and also stabilizes the pH of the water. The preferred borate compound contains tetraborate ions. A suitable example is disodium tetraborate pentahydrate. When combined with sodium hydrogen sulfate, disodium tetraborate pentahydrate stabilizes the alkalinity and pH levels of the water. Disodium tetraborate pentahydrate also increases the oxidizing ability of the composition relative to when dipotassium peroxodisulfate is used alone. This reduces the amount of chlorine the ECG needs to produce and prologs the life of the ECG cells.

In a particular embodiment, the composition comprises dipotassium peroxodisulfate, sodium hydrogen sulfate, aluminum sulfate, tetrasodium EDTA, and disodium tetraborate pentahydrate.

In another particular embodiment, the composition comprises 30%-50% w/w dipotassium peroxodisulfate; 10%-25% w/w sodium hydrogen sulfate; 10%-25% w/w aluminum sulfate; 10%-25% w/w tetrasodium EDTA; and 10%-25% disodium tetraborate pentahydrate.

The composition may be made by blending the desired amount of each ingredient in its solid form together using conventional solids or powder blending techniques.

The composition may be administered to the water as a powder blend, pellet, or the like. Alternatively, the composition may first be dissolved in a sample of water prior to being mixed into the body of water being treated. A preferred administrate rate is one pound of the composition per 12,000 gallons of water every two weeks.

EXAMPLE

This section describes a particular example of the water cleaning composition. The example is provided for illustrative purpose; the present invention is not necessarily limited thereto.

A water cleaning composition containing the following ingredients was prepared:
- 40% w/w dipotassium peroxodisulfate;
- 15% w/w sodium hydrogen sulfate;
- 10% w/w aluminum sulfate;
- 15% w/w tetrasodium EDTA; and
- 20% disodium tetraborate pentahydrate.

The composition was prepared by weighing the desired amount of each ingredient in solid form and blending the ingredients together.

Various modifications of the embodiments described here can be made without departing from the spirit and scope of the invention as described above and as defined in the appended claims.

What is claimed is:

1. A pool water cleaning composition comprising at least five different constituents added in effective amounts so that, when the water cleaning composition is added to pool water to be treated at a ratio of one pound of the composition to 12,000 gallons of the pool water, the different constituents will respectively function as:
   an oxidizer;
   a pH reducer;
   a flocculent;
   a chelator; and
   a borate compound;
   wherein the oxidizer is dipotassium peroxodisulfate ($K_2S_2O_8$) and is about 30% to about 50% w/w of the composition;
   wherein the pH reducer generates bisulfate ions in an aqueous solution and is about 10% to about 25% w/w of the composition;
   wherein the chelator is about 10% to about 25% w/w/ of the composition;
   wherein the chelator is an ethylenediamine tetraacetic acid (EDTA); and
   wherein the EDTA is tetrasodium EDTA.

2. The composition of claim 1, wherein the flocculent is about 10% to about 25% w/w of the composition, and the borate compound is about 10% to about 25% w/w of the composition.

3. The composition of claim 1, wherein the pH reducer is sodium hydrogen sulfate ($NaHSO_4$).

4. The composition of claim 1, wherein the flocculent is iron-free.

5. The composition of claim 4, wherein the flocculent is about 10% to about 25% w/w of the composition.

6. The composition of claim 4, wherein the flocculent is aluminum sulfate ($Al_2(SO_4)_3$).

7. The composition of claim 1, wherein the borate compound is a tetraborate compound.

8. The composition of claim 7, wherein the borate compound is about 10% to about 25% w/w of the composition.

9. The composition of claim 7, wherein the tetraborate compound is disodium tetraborate pentahydrate.

10. The composition of claim 9, wherein the pH reducer is sodium hydrogen sulfate, the combination of the sodium hydrogen sulfate and the disodium tetraborate pentahydrate stabilizing alkalinity and pH levels of the water.

11. The composition of claim 9, wherein the disodium tetraborate pentahydrate increases the oxidizing ability of composition relative to the dipotassium peroxodisulfate alone.

12. A pool water cleaning composition comprising at least five different constituents added in effective amounts so that, when the water cleaning composition is added to pool water to be treated at a ratio of one pound of the composition to 12,000 gallons of the pool water, the different constituents will respectively function as:
   an oxidizer;
   a pH reducer;
   a flocculent;
   a chelator; and
   a borate compound;
   wherein the oxidizer is dipotassium peroxodisulfate ($K_2S_2O_8$) and is about 30% to about 50% w/w of the composition;
   wherein the pH reducer generates bisulfate ions in an aqueous solution and is about 10% to about 25% w/w of the composition;
   wherein the chelator is about 10% to about 25% w/w/of the composition; and
   wherein:
   the pH reducer is sodium hydrogen sulfate;
   the flocculent is aluminum sulfate;
   the chelator is tetrasodium EDTA; and
   the borate compound is disodium tetraborate pentahydrate.

13. The composition of claim 12, wherein the aluminum sulfate is about 10% to about 25% w/w of the composition, and the disodium tetraborate pentahydrate is about 10% to about 25% w/w of the composition.

* * * * *